US007768215B1

(12) United States Patent
Shiwei et al.

(10) Patent No.: US 7,768,215 B1
(45) Date of Patent: Aug. 3, 2010

(54) METHOD AND SYSTEM FOR CONTROLLING TRANSIENT CURRENT SIGNALS IN AN ELECTRONIC BALLAST

(75) Inventors: Yu Shiwei, Shanghai (CN); Gao Qin, Shanghai (CN); Guo Sui, Shanghai (CN)

(73) Assignee: Universal Lighting Technologies, Inc., Madison, AL (US)

( * ) Notice: Subject to any disclaimer, the term of this patent is extended or adjusted under 35 U.S.C. 154(b) by 221 days.

(21) Appl. No.: 12/147,138

(22) Filed: Jun. 26, 2008

(51) Int. Cl.
*G05F 1/00* (2006.01)
*H02M 7/00* (2006.01)

(52) U.S. Cl. ....................... 315/291; 315/307; 315/354; 315/247; 315/224; 363/75; 363/74; 363/21.08; 363/21.11

(58) Field of Classification Search ................. 315/247, 315/246, 209 R, 224, 225, 291, 297, 307–311, 315/354, 356; 363/19, 21.07, 21.08, 21.1, 363/21.11, 21.15, 21.16, 56.03, 56.04, 74, 363/75
See application file for complete search history.

(56) References Cited

U.S. PATENT DOCUMENTS

| | | | | |
|---|---|---|---|---|
| 6,278,245 | B1 | 8/2001 | Li et al. | |
| 6,479,949 | B1 | 11/2002 | Nerone et al. | |
| 6,856,102 | B1 | 2/2005 | Lin et al. | |
| 7,064,495 | B2 | 6/2006 | Lurkens et al. | |
| 7,190,151 | B2 | 3/2007 | Ribarich et al. | |
| 7,439,689 | B2 * | 10/2008 | Honda et al. | 315/307 |
| 2004/0113569 | A1 * | 6/2004 | Henry | 315/307 |
| 2007/0152609 | A1 * | 7/2007 | Po | 315/291 |
| 2009/0021188 | A1 * | 1/2009 | Honda et al. | 315/307 |

* cited by examiner

*Primary Examiner*—Tuyet Vo
(74) *Attorney, Agent, or Firm*—Waddey & Patterson; Mark J. Patterson

(57) ABSTRACT

An electronic ballast including a rectifying circuit to provide a signal representative of the current signal associated with a buck inductor, a monitoring circuit to provide a monitoring circuit signal when the signal representative of the buck inductor is within a specified range, and a comparing circuit coupled to the rectifying circuit and the monitoring circuit and operable to alter the output of the power converter circuit driving the lamps in response to comparisons between the signals from the rectifying circuit and the monitoring circuit to control power conditions in the ballasts.

20 Claims, 4 Drawing Sheets

METHOD AND SYSTEM FOR CONTROLLING TRANSIENT CURRENT SIGNALS IN AN ELECTRONIC BALLAST

BACKGROUND OF THE INVENTION

The present invention relates generally to electronic ballasts for gas discharge lamps. More particularly, the present invention pertains to controlling power signals in an electronic ballast. Even more particularly, this invention relates to controlling transient current signals in the electronic ballast by monitoring the voltage across a buck inductor.

Transient current signals occur in electronic ballasts for a variety of reasons. For example, bypass capacitors associated with a power converting circuit can quickly discharge during a change in the polarity of the power signal, caused by one switching transistor ceasing to conduct while another switching transistor begins to conduct. This discharge can result in consequential, although ephemeral or transient, large current signals in the ballast. These signals can have deleterious effects, as discussed below.

Regardless of the particular source, transient currents in the power converting circuit are uniquely troubling because significant inefficiencies can result if large transient currents are present. Moreover, large transient currents in the power converting circuit can damage components or cause components to operate unreliably—both of which, intuitively, are undesirable.

Monitoring and controlling power signals in an electronic ballast has not been an undertaking ignored by the prior art. Consider U.S. Pat. No. 6,479,949 which discloses, in relevant part, an electronic ballast having a power regulator that samples the current in the power converting circuit. In response to under or overvoltage conditions in the lamp, which are reflected in the sampled current, the power regulator shifts the operating frequency of the power converter circuit relative to the resonant frequency of the LC tank circuit. This frequency shift, either away or toward the resonant frequency of the tank circuit, alters the magnitude of the driving voltage applied across the lamp to compensate for changing conditions in the ballast. However, such power control methods have several drawbacks, such as operating the power converter circuit at a frequency disparate from the resonant frequency of the tank circuit can result in power inefficiencies and difficulty effectively managing transient current signals.

What is needed, then, is an electronic ballast that can monitor and control current signals in the power converting circuit, especially transient current signals, to prevent operational inefficiencies, damage during high transient current conditions, and ineffective operation during low power conditions.

BRIEF SUMMARY OF THE INVENTION

The present invention relates generally to an electronic ballast having power signal monitoring and control circuitry. Specifically, the present invention pertains to electronic ballasts capable of monitoring and controlling transient currents/power signals in the power converter circuit energizing the lamp. To effectively control the current signals in the ballast, the current signals must first be known. To this end, the present invention provides a rectifier circuit coupled to the power converter circuit. Preferably, the rectifier circuit is a full wave rectifier and is coupled to the buck inductor in the power converter circuit. The rectifier circuit serves to generate a rectified buck inductor signal that corresponds to the voltage and/or current signals across/in the buck inductor. In essence, the rectifier circuit samples the substantially AC power signal across/in the buck inductor and generates a substantially DC signal (the rectified buck inductor signal) representative of the AC power signal associated with the buck inductor. Thus, the rectifier circuit provides information about the power signal(s) in the power converter circuit. When the levels of the power/current signals associated with the buck inductor are low, the level of the rectified buck inductor signal will also be low and when the power/current signal is high, the level of the rectified buck inductor signal will also be high.

Now that information about the power/current signals in the power converter circuit is known, parameters concerning acceptable limits or boundaries for the power signals must be drawn. This function is satisfied, in part, by the monitoring circuit. The monitoring circuit is coupled to the rectifying circuit and provides a monitoring circuit signal when the rectified buck inductor signal is in an activation range. The activation range defines a range of rectified buck inductor signal values that cause the monitoring circuit to generate the monitoring circuit signal. The role of the monitoring circuit signal will be explained in more detail below.

The present invention also provides a comparing circuit to evaluate the state of the power/current conditions in the ballast, via information from the rectified buck inductor signal, and instruct the power converter circuit to alter its operation to correct, in part, power/current condition anomalies caused by transient current signals in the power converter circuit. To accomplish this task, the comparing circuit receives the rectified buck inductor signal, the monitoring circuit signal, when present, and the output of a reference signal generator (e.g. a DC voltage source). The comparing circuit generates an output that is modulated by comparisons between the reference signal and a combination of the rectified buck inductor signal and, when present, the monitoring circuit signal. The output of the comparing circuit is delivered to the input of the power converter circuit to control the operation of the converter (to keep power conditions in the ballast in a desired range).

The general operation of the present invention can be illuminated by describing the reaction to various power/current signal conditions. When the rectified buck inductor signal is high (indicating the power/current signal associated with the buck inductor is also high), it will exceed the reference generator signal and cause the output of the comparing circuit to direct the power converter circuit to reduce power and correct any high power conditions, e.g. transient current signals from the bypass capacitor.

Consequently, the power/current conditions in the power converter circuit will drop which also mandates that the power signal associated with the buck inductor will fall. Further, as the rectified buck inductor signal is representative of the power/current in the buck inductor, the signal level of the rectified buck inductor signal will also fall. In this way, the present invention defines an upper boundary of desired power conditions in the ballast. When that boundary is exceeded (i.e. when the rectified buck inductor signal is greater than the reference generator signal), the present invention retards the production of the power converter circuit.

However, low power conditions can also be harmful to the ballast—low power conditions may result in unpredictable operation. Thus, the present invention provides a mechanism to monitor and police low power conditions. After high power/current conditions are detected and the power converter is directed to reduce its output, the rectified buck inductor signal will eventually drop to a low signal value. Because the reference generator signal is constant and the rectified buck inductor signal is low, the reference generator signal will exceed the rectified buck inductor signal and direct the power converter circuit to increase its power output until the rectified buck inductor signal once again exceeds the reference generator signal.

At a predetermined point during the above-described sequence, the monitoring circuit will begin to generate the monitoring circuit signal. Specifically, the monitoring circuit signal will be provided when the signal level of the rectified buck inductor signal falls into the activation range (such as after a transient current in the buck inductor has fallen to zero). In effect, the monitoring circuit signal puts a limit on the maximum pulse width of the output of the comparing circuit to avoid the loss of current control in the ballast. This occurs because the monitoring circuit signal will eventually exceed the reference generator signal and cause the comparing circuit to cease instructing the power converter circuit to increase its output. In sum, the monitoring circuit signal constrains the power supply circuit from continually increasing its output when the voltage across of buck inductor is at or near zero and, thereby, prevents the loss of current control in the ballast.

In the manner described above, the present invention allows precise control of the power/current conditions in the ballast by monitoring current and voltage signal through/in the buck inductor and, according to these power signals, directs the operation of the power converter circuit maintain desired power conditions in the electronic ballast.

DETAILED DESCRIPTION OF THE INVENTION

The present invention relates generally to an electronic ballast having power signal monitoring and control circuitry. More specifically, the present invention relates to electronic ballasts capable of monitoring and controlling transient currents, or more generally transient power signals, in the power converter circuit energizing the lamp.

Figure 1:
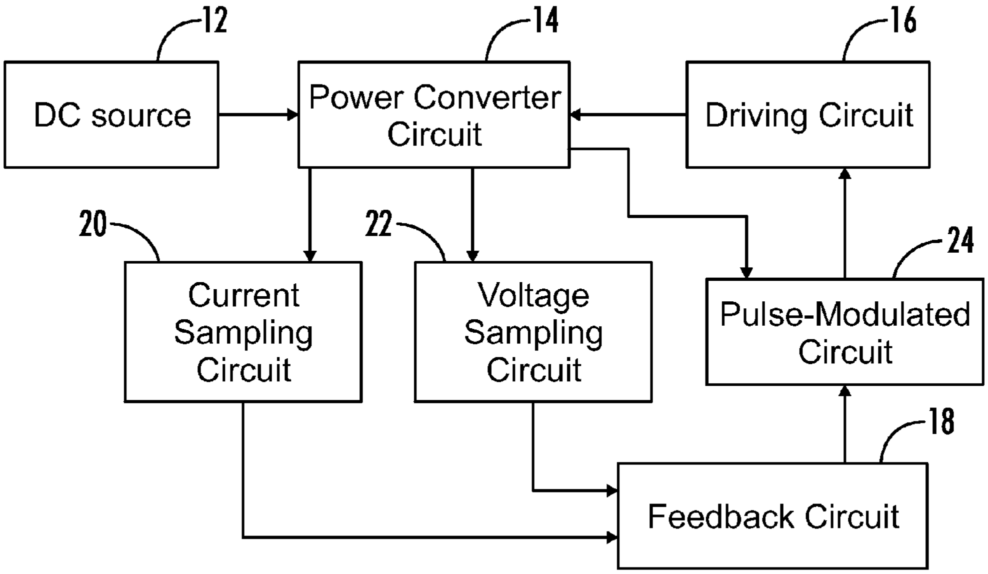
FIG. 1 is a block diagram of one embodiment of the present invention.

FIG. 1 is a block diagram of a portion of an electronic ballast illustrating several inventive facets of the present invention. The block diagram depicts a DC source 12 supplying power to an electronic ballast. The DC source 12 may be a generator providing direct current power signals. The DC source 12 may also describe the output of a rectifier circuit, that accepts alternating current signals from an alternating current source and converts them into substantially constant direct current signals. Further, the DC source 12 may describe the output of a power factor correcting circuit (or combination power factor correcting and boost circuit) that accepts a direct current signal input, usually from a rectifier circuit, and generates a direct current signal at a desired level and ensures that the power factor of the alternating current source does not deviate from a predetermined range.

The DC source 12 is coupled to a power converter or inverter circuit 14. The power converter circuit 14 accepts the output from the DC source 12 and converts the direct current power signals into high frequency alternating current signals that are provided to a circuit that energizes the lamp(s). The power converter circuit 14 includes, typically, two or four switching transistors that facilitate the conversion of the direct current signals from the DC source 12 into high frequency alternating signals suitable to operate the lamp(s).

FIG. 1 also depicts a driving circuit 16. The driving circuit 16 controls the operation of the switching transistors in the power converter circuit 14. Specifically, the driving circuit 16 manages the switching transistors by modulating the duration of the conducting and non-conducting states of the transistors. This modulation functions to control the ultimate operation of the lamp(s). In a preferred embodiment of the present invention, the driving circuit 16 is part of the power converter circuit 14.

The present invention may also include a feedback circuit 18 that functions to adjust the operation of the lamp, via the driving circuit 16, in response to changes in state of the lamp(s), such as changes in the lamp's resistance or pressure or the illumination intensity demanded of the lamp(s), etc. To accurately monitor changes in the state of the lamp(s), the feedback circuit 18 relies on information provided by a current sampling circuit 20 and a voltage sampling circuit 22 to generate a lamp power signal.

Figure 4:
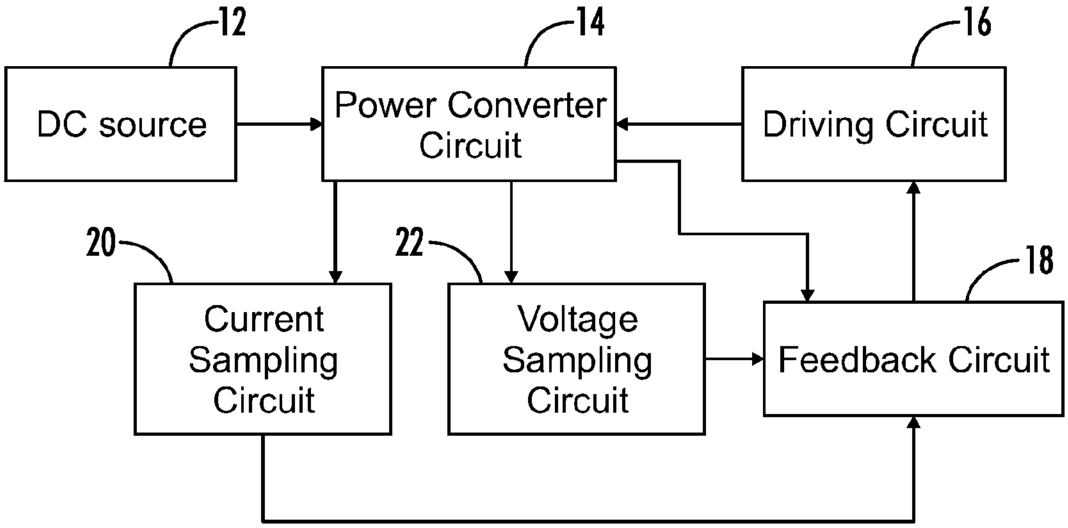
FIG. 4 (PRIOR ART)
FIG. 4 is a block diagram of a prior art device.

Several of the components of the present invention described thus far, with reference to FIG. 1, are similar in configuration and operation to those well known in the prior art, an example of which is shown in FIG. 4. However, an electronic ballast with only the features described above and shown in FIG. 4 has a significant deficiency. Namely, the electronic ballasts of the prior art have difficulty coping with transient current conditions/surges associated with changes in the polarity of the power signal feeding the lamp(s) and transient current conditions caused by component failures and other anomalies. More particularly, the prior art lacks the means to accurately monitor and precisely control the current through the buck inductor, and hence in the power converter circuit, during transient current conditions.

Figure 2:
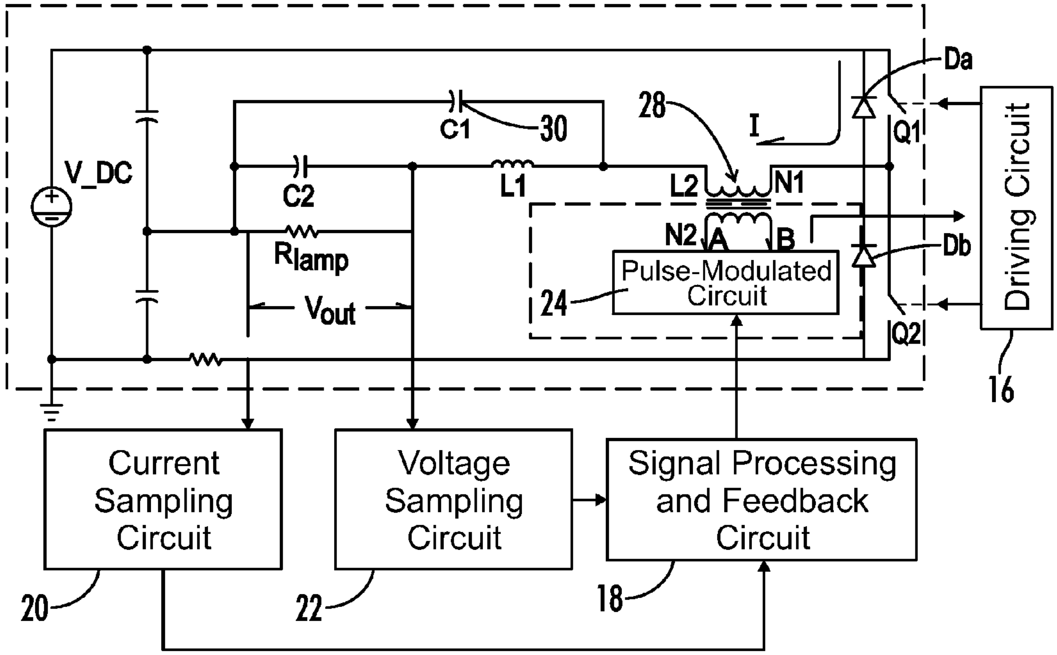
FIG. 2 is a schematic of one embodiment of the present invention.

To rectify this problem the present invention provides a pulse-modulated circuit (PMC) 24. The PMC 24 is receptive to communications from the feedback circuit 18 concerning the state of the lamp(s). Further, the PMC 24 samples/receives information from the power converter circuit 14 about the power signal conditions associated with the LC circuit of the power converter circuit 26, shown in FIG. 2. With the information about the state of the lamps(s), via the feedback circuit 18, and the power conditions in the power converter 14, the PCM 24 is operable to direct the operation of the driving circuit 16 to exactly control power conditions in the power converter. This includes transient current conditions caused by a change in the polarity of the power signal and the resultant discharge of the bypass capacitor 30.

Figure 3:
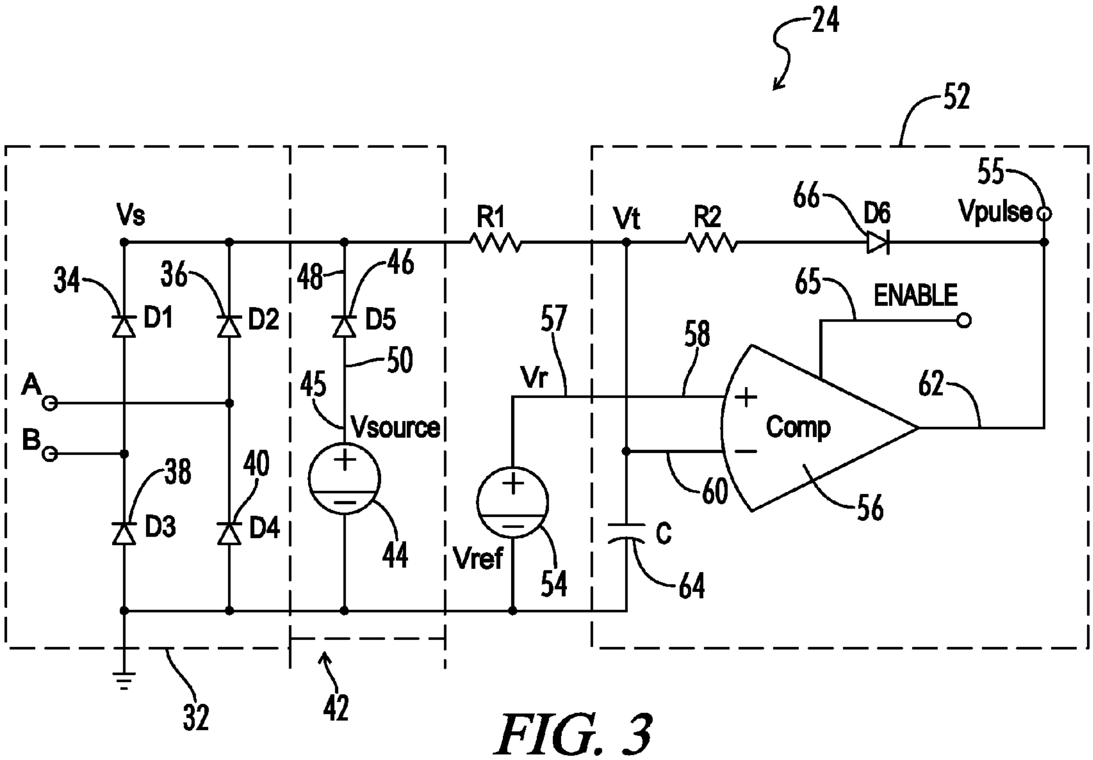
FIG. 3 is a schematic of one embodiment of a pulse modulated circuit as used in the present invention.

Now that a general overview of the present invention has been completed, a more detailed discussion of the structure and operation of the invention is in order. FIG. 3 is a preferred embodiment of the PCM 24. The PCM 24 includes a rectifier circuit 32 or conditioning circuit 32 coupled to the power converter circuit 14. Preferably, the rectifier circuit 32 is coupled to the buck inductor 28 in the power converter circuit 14, as illustrated in FIG. 3. Although the rectifier circuit 32 is shown as magnetically coupled to the buck inductor 28, e.g. through a secondary winding, the rectifier circuit 32 may also be coupled to the buck inductor 28 through a capacitive or resistive connection.

The rectifier circuit 32 provides a rectified buck inductor signal, also referred to as a buck inductor signal. The rectified buck inductor signal is a rectified version of the power (current and/or voltage) signal associated with the buck inductor 28, i.e. it is a direct current version of the alternating current signal associated with the buck inductor 28, as shown in steps 80 and 82 of FIG. 5. The rectified buck inductor signal reflects the power signals/conditions in the buck inductor 28 regardless of the phase of the power signals. The rectified buck inductor signal includes/describes all signal values of the signal provided by the rectifier circuit 32 including a signal with a magnitude of zero Volts or, more generally, the absence of any particular signal information. The rectifier circuit 32 may generate the rectified buck inductor signal through a one of a variety of different circuit configurations well known to those of ordinary skill in the art. However, one effective implementation utilizes four diodes 34, 36, 38, and 40 arranged as a full-wave rectifier. The input to the full-wave rectifier is coupled to the buck inductor 28.

A monitoring circuit 42 or current limiting circuit 42 is coupled to the rectifier circuit 32 and functions to provide a monitoring circuit signal (also referred to as a current limiting signal, pulse-width limiting signal, or maximum pulse-width limiting signal) when the rectified buck inductor signal is in the activation range, as shown in step 84. In the preferred embodiment, and detailed in FIG. 3, the monitoring circuit 42 is comprised of a power source 44 or first voltage source 44 with a first voltage source output 45 coupled to a first voltage-controlled switch 46 having an activation level. The voltage-controlled switch 46 may be a diode 46 having a cathode 48 coupled to the rectifying circuit 32 and an anode 50 coupled to the source 44 or output 45.

With such a configuration, the activation range would be defined by the signal level generated by the source 44 and the biasing voltage of the diode 46, or more generally the turn-on voltage of the voltage-controlled switch 46 or the activation level of the switch 46. Consequently, the monitoring circuit 42 will provide the monitoring circuit signal only when the signal level of the power source 44 exceeds the combined signal level of the rectified buck inductor signal and the turn-on voltage of the voltage-controlled switch 46. Alternatively described, the first voltage-controlled switch 46 may have a switch output 48 responsive to the rectified buck inductor signal to provide the monitoring circuit signal. Thus, in one embodiment, the rectified buck inductor signal would be in the activation range when the signal level of the rectified buck inductor signal approaches or falls to zero as a result of transient current in the buck inductor approaching or falling to zero.

FIG. 3 also depicts a comparing circuit 52 or evaluating circuit 52. The comparing circuit 52 is coupled to the rectifier circuit 32 to receive the rectified buck inductor signal, the monitoring circuit 42 to receive the monitoring circuit signal, when present, and a reference signal generator 54 or reference generator 54 to receive a reference signal. The reference signal generator 54 may include a second voltage source 54 with a second voltage source output 57 providing the reference signal. The comparing circuit 52 provides a comparing circuit output signal or evaluation signal that is modulated by comparisons between the reference signal and the rectified buck inductor signal or the monitoring circuit signal or a combination of the rectified buck inductor signal and the monitoring circuit signal, as shown in steps 86 and 88 of FIG. 5. The comparing circuit output signal is sent to the input of the power converter circuit 55 (or more particularly the driving circuit 16). The power converter circuit 14 is responsive to changes in the comparing circuit output signal to control the current through the buck inductor 28. This enables the present invention to effectively manage transient current conditions.

The comparing circuit 52 may include a comparator 56 having a first comparator input 58 coupled to the reference signal generator 54 (or second voltage source output 57), a second comparator input 60 coupled to the rectifier circuit 32 and the monitoring circuit 42, and an output 62 coupled to the power converter circuit 14, or more accurately coupled to the input of the converter 55. The comparator 56, and the comparing circuit 52 more generally, may also have an enabling input 65 to control the operation of the comparator 56.

Figure 5:
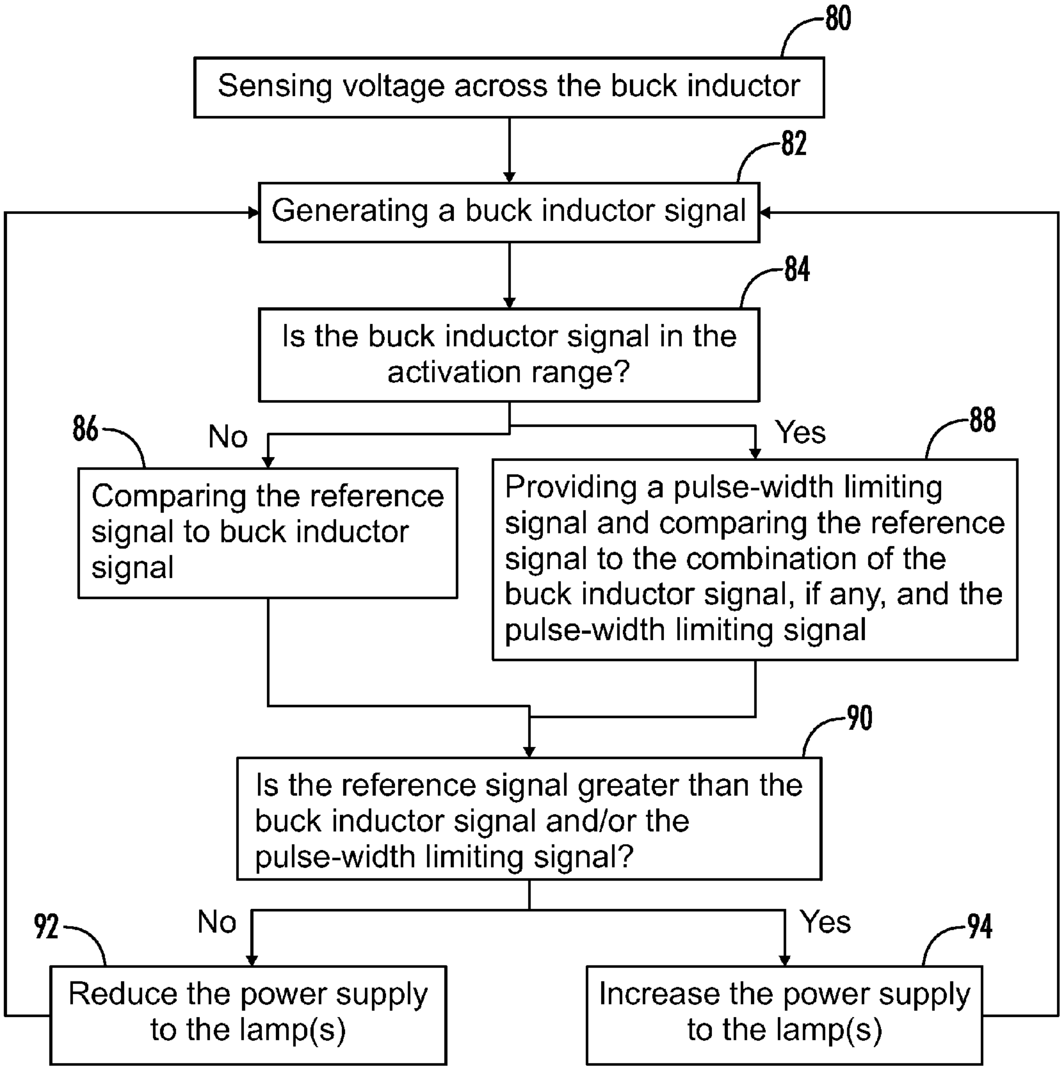
FIG. 5 is a flow diagram of the operation of one embodiment of the present invention.

Now that one embodiment of the topology of the invention has been described, the operation of the present invention will be explained in detail below and as shown in steps 90, 92, and 94 of FIG. 5. For illustrative purposes consider that the comparing circuit output signal is high and the polarity of the power signal energizing the lamp(s) is about to change. As the power signal energizing the lamp(s) approaches the zero crossing (the transition between polarities) the current/voltage signals associated with the buck inductor 28 and LC circuit 26 will fall. This causes the bypass capacitor 30 to discharge which creates a large transient current through the buck inductor 28.

In response to this transient current, the rectified buck inductor signal will rise (because the current/voltage associated with the buck inductor 28 will rise). The comparing circuit 52 may also include a comparing circuit capacitor 64 and the rectified buck inductor signal will charge the comparing circuit capacitor 64, which is coupled to the second input of the comparator 60. Assuming the comparing circuit 52 is enabled, the comparator 56 will compare the voltage across the capacitor 64, fed by the rectified buck inductor signal, to the reference generator signal. Eventually, the transient current/power signals generated by the discharge of the bypass capacitor 30, via the rectified buck inductor signal, will cause the voltage across the comparing circuit capacitor 64 to exceed the reference generator signal. When this occurs the comparing circuit output signal will be low. A low output instructs the power converter circuit 14 to reduce its output to offset the transient current conditions effectuated by the discharge of the bypass capacitor 30.

In one embodiment, the charging of the comparing circuit capacitor 64 is facilitated, in part, by a second voltage controlled switch 66 or bypass switch 66 positioned between the output of the comparator 62 (or input of the converter 55), or more generally the comparing circuit 52, and the outputs of the monitoring and rectifier circuits 42 and 32. The second voltage controlled switch 66 may be a second diode 66 with its anode (or second connector) coupled to the outputs of the monitoring and rectifier circuits 42 and 32 and its cathode (or first connector) coupled to the output of the comparator 62. Consequently, if the output of the comparator 56 is high, the diode 66 will be reversed biased and the rectified buck inductor signal and the monitoring circuit signal, when present, may charge the comparing circuit capacitor 64. When the output of the comparator 62 is low, the diode 66 will be forward biased and the rectified buck inductor signal and the monitoring circuit signal, when present, will be conducted across the diode 66 and the comparing circuit capacitor 64 will not be charged.

Thus, when the rectified buck inductor signal causes the output of the comparator 62 to go low, the rectified buck inductor signal, and the monitoring circuit signal (if present) will be shunted to the output of the comparator 62. With no signals to charge the bypass capacitor 30 it will discharge. After the bypass capacitor 30 has sufficiently discharged (and the power converter circuit 14 has reduced its output) the power signals associated with the buck inductor 28, and hence the rectified buck inductor signal, will drop. However, as the output of the comparator 62 is low, the monitoring circuit signal (and the rectified buck inductor signal, if any) will not charge the comparing circuit capacitor 64. Instead the monitoring circuit signal will flow to the output of the comparator 62.

With neither the monitoring circuit signal nor the rectified buck inductor signal charging the comparing circuit capacitor 64 and assuming the comparator 56 is enabled, the reference generator signal will exceed the voltage across the comparing circuit capacitor 64 and cause the comparator 56 to change its output 62 to a high state. This, in turn, results in the power converter circuit 14 increasing its power supply to the lamp. Now that the output of the comparator 62 is high, the second diode 66 is reverse biased and the monitoring circuit signal may begin to charge the comparing circuit capacitor 64.

As such, and with the rectified buck inductor signal in the activation range, the monitoring circuit signal, with or without contribution from the rectified buck inductor signal (if the magnitude of the rectified buck inductor signal is zero it will not contribute), will begin to charge the comparing circuit capacitor 64 until the voltage across the capacitor 64 exceeds that of the reference generator signal. This causes the output of the comparator 62 to go low which directs the converter 14 to reduce its output to prevent a loss of current control in the ballast. In effect, the monitoring circuit 42 and the monitoring circuit signal limit the efforts of the comparing circuit 52 to reinvigorate the ballast, via the converter 14. Without such a protective measure, and assuming the rectified buck inductor signal is low or zero (e.g. in the activation range) the voltage across the capacitor 64 would be below that of the reference signal, thereby causing an increase in power supplied to the lamp and, possibly, resulting in the failure of the ballast. The monitoring circuit 42 intervenes to prevent this from happening.

When the monitoring circuit signal exceeds the reference generator signal and the output of the comparator 62 goes low, as described above, the monitoring circuit signal and/or the rectified buck inductor signal will conduct through the forward biased diode 66. Accordingly, after a predetermined time, the reference generator signal will exceed the voltage across capacitor 64 and instruct the converter 14 to increase its efforts.

Thus, although there have been described particular embodiments of the present invention of a new and useful METHOD AND SYSTEM FOR CONTROLLING TRANSIENT CURRENT SIGNALS IN AN ELECTRONIC BALLAST, it is not intended that such references be construed as limitations upon the scope of this invention except as set forth in the following claims.

What is claimed is:

1. An electronic ballast for a gas discharge lamp comprising:

a power converter circuit comprising a buck inductor;

a rectifier circuit coupled to the power converter circuit to provide a rectified buck inductor signal corresponding to current in the buck inductor;

a monitoring circuit defining an activation range and coupled to the rectifier circuit to provide a monitoring circuit signal when the rectified buck inductor signal is in the activation range;

a reference signal generator operable to provide a reference signal;

a comparing circuit coupled to the rectifier circuit, to the monitoring circuit, and to the reference signal generator to receive the rectified buck inductor signal, the monitoring circuit signal, when present, and the reference signal;

the comparing circuit being operable to provide a comparing circuit output signal that is modulated by comparisons between the reference signal and a combination of the rectified buck inductor signal and, when present, the monitoring circuit signal; and the power converter circuit further comprising an input coupled to receive the comparing circuit output signal, the power converter circuit being responsive to the comparing circuit output signal to control the current in the buck inductor.

2. The electronic ballast of claim 1 wherein the activation range includes signals having a magnitude of zero Volts.

3. The electronic ballast of claim 1, wherein the monitoring circuit comprises:

a first voltage source with a first voltage source output;

a first voltage-controlled switch, with an activation level, coupled to the first voltage source; and wherein the combination of the first voltage source output and the activation level define the activation range.

4. The electronic ballast of claim 3, wherein the first voltage-controlled switch is a diode.

5. The electronic ballast of claim 1, wherein the comparing circuit comprises a comparator with a first comparator input and the reference generator comprises a second voltage source with a second voltage source output providing the reference signal, the second voltage source output coupled to the first comparator input.

6. The electronic ballast of claim 5, wherein the comparator has a comparator output and the comparing circuit output signal is provided at the comparator output, the ballast further comprising:

a second voltage controlled switch; and wherein the second voltage controlled switch is coupled between the comparator output and the rectifier circuit.

7. The electronic ballast of claim 5, wherein the comparator has a second comparator input operable to receive the combination of the rectified buck inductor signal and, when present, the monitoring circuit signal; and wherein the comparing circuit further comprises a capacitor coupled to the second comparator input.

8. A method of operating an electronic ballast for a gas discharge lamp comprising:

(a) sensing a voltage across a buck inductor in a power converter circuit;

(b) rectifying the sensed voltage to generate a buck inductor signal;

(c) generating a pulse-width limiting signal when the buck inductor signal is in an activation range;

(d) if the buck inductor signal is in the activation range, comparing a combination of the buck inductor signal and the pulse-width limiting signal with a reference signal;

(e) if the buck inductor signal is outside of the activation range, comparing the buck inductor signal with the reference signal; and (f) modulating an input of the power converter circuit in response to the comparison of the reference signal with the buck inductor signal and, when present, the pulse-width limiting signal to control current in the buck inductor.

9. The method of claim 8, further comprising sensing power conditions in the gas discharge lamp and preventing modulation of the power converter circuit input of step (f) when the power conditions are in a predetermined range.

10. The method of claim 8, wherein the sensed voltage of step (a) is sensed via a winding magnetically coupled to the buck inductor.

11. The method of claim 8, wherein the pulse-width limiting signal of step (c) is generated by a first voltage source coupled to a first voltage-controlled switch with a switch output responsive to the buck inductor signal.

12. The method of claim 11, wherein the activation range is defined by the first voltage source and the first voltage-controlled switch.

13. The method of claim 8, further comprising:

coupling the power converter circuit input to the buck inductor signal and, when present, the pulse-width limiting signal via a second voltage-controlled switch.

14. The method of claim 13, wherein the second voltage-controlled switch is a diode.

15. An electronic ballast for a gas discharge lamp comprising:

a power converter circuit comprising a buck inductor and a power converter input;

a conditioning circuit coupled to the buck inductor to provide a buck inductor signal responsive to current changes through the buck inductor;

an evaluating circuit coupled to the conditioning circuit, to receive the buck inductor signal, and the input of the power converter circuit, wherein the evaluating circuit is operable to provide a evaluation signal to the power converter input;

a current limiting circuit coupled to the conditioning circuit and the evaluating circuit and having an activation range, wherein the current limiting circuit provides a current limiting signal to the evaluating circuit when the buck inductor signal is in the activation range; and wherein the evaluating circuit modulates the evaluation signal in response to changes in the current limiting signal, if provided, and the buck inductor signal, wherein the power converter circuit responds to changes in the evaluation signal by moderating current through the buck inductor.

16. The electronic ballast of claim 15, wherein the conditioning circuit comprises a rectifying circuit with an input coupled to the buck inductor and an output to provide the buck inductor signal.

17. The electronic ballast of claim 15, wherein the current limiting circuit comprises a first direct current voltage source with an output and a diode coupled to the first direct current voltage source and having an activation level, wherein the output of the first voltage source and the activation level define the activation range.

18. The electronic ballast of 15 wherein the activation range includes a signal having a magnitude of zero Volts.

19. The electronic ballast of claim 15, further comprising:

a bypass switch having a first connector coupled to the power converter input and a second connector coupled to both the conditioning circuit and the current limiting circuit, wherein the bypass switch is responsive to voltage differentials between the first and second connectors.

20. The electronic ballast of claim 19, wherein the bypass switch is a diode.

* * * * *